March 5, 1963  H. M. DE TURK  3,080,120
TRACK INSULATING WASHERS
Filed Nov. 2, 1959
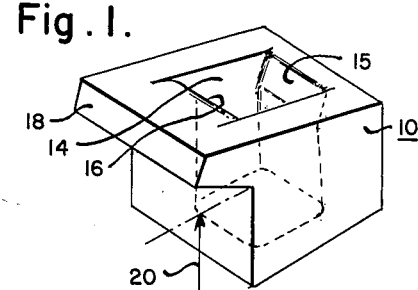
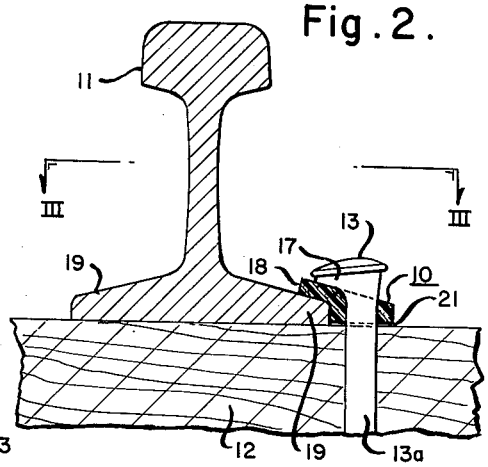
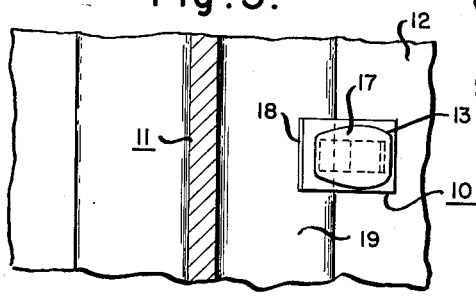
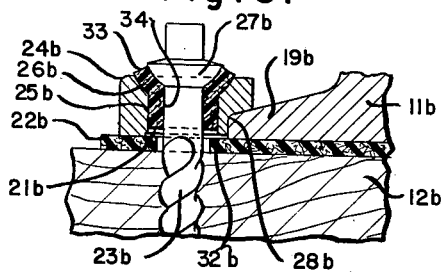
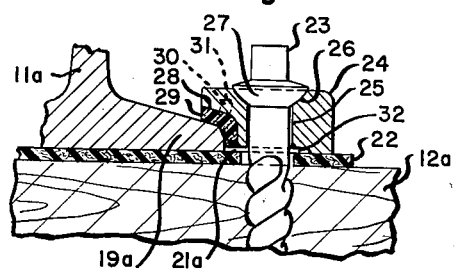
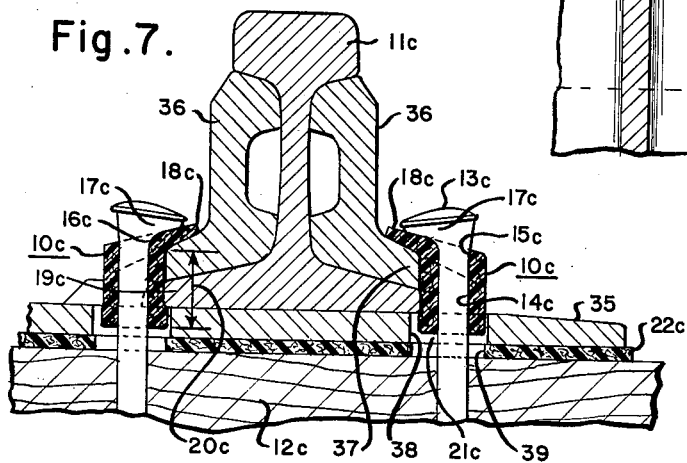
INVENTOR
Harry Martin DeTurk
By *Hoopes, Leonard & Buell*
his Attorneys 3,080,120
TRACK INSULATING WASHERS
Harry Martin De Turk, 1318 La Clair St.,
Pittsburgh 18, Pa.
Filed Nov. 2, 1959, Ser. No. 850,265
2 Claims. (Cl. 238—152)

This invention relates to track insulating washers and particularly to track insulating washers for use with railroad track and the like wherein it is desirable to insulate the track from the spikes employed in securing the track to a tie.

It is commonly known that tracks are used to carry electric current for signaling purposes among other things. A great deal of this electric current is lost through grounding, i.e., electrical leakage, which occurs in small part from the rail through the tie plates, and through the tie itself but primarily through the spikes used to secure the rails to the tie and particularly if the spikes happen to penetrate the tie into the ground. This leakage is not only wasteful of power but perhaps even more important it weakens the signals carried along the rails. It is therefore, highly desirable to eliminate or minimize such leakage to conserve power and equipment and to strengthen the signals carried on said rails. Efforts to insulate track from grounding have been made heretofore; however, generally speaking they have been elaborate schemes such as disclosed by United States Patent No. 998,108 to Metcalf and United States Patent No. 2,779,543 to Gronlund. As typified by the above cited patents, these inventions included specially constructed ties, tie plates, cushions and hold down bolts and clamps that cost much more than the savings involved in preventing leakage and were otherwise impractical in that they could not be serviced and maintained with conventional trackage tools. Such schemes also added many new parts to the trackage thereby increasing the service and maintenance required far beyond their usefulness. In short, prior attempts to insulate trackage have been for the most part "more trouble than it's worth." Applicant has invented an insulating washer of significant simplicity that not only minimizes electrical leakage but also may be used with standard track, ties, and track fastenings; and further does not require the use of any tools other than conventional track tools. It requires little or no additional maintenance or service and is marketable at a cost sufficiently low that it pays for itself through the savings accumulated by the conservation of power as well as accomplishing its primary purpose of insuring a stronger more positive signal along the trackage utilizing it. To summarize, applicant has invented an insulating washer for use with railroad track and the like that is practical as well as useful.

Applicant provides an insulating washer comprising a block of tough substantially non-deformable non-conductive material such as virtually steel-hard nylon reinforced with fibre-glass with a central opening passing through it, into which a railroad spike is inserted up to the head of the spike, said block having an extended upper portion which fits over the lower flange of the rail and upon which the head of the spike bears whereby to space the spike from the rail.

My insulating washer may be made for various types of railroad spikes such as the screw type spike as well as for the conventional spike and also can be made for use with tie plates, rail cushions and/or splice bars among others.

Other details, objects and advantages of the invention will become apparent as the following description of certain present embodiments thereof proceeds.

In the accompanying drawings, I have shown certain present preferred embodiments of the invention in which:

FIGURE 1 is an isometric view of an insulating washer in accordance with my invention;
FIGURE 2 is a cross-sectional view of my insulating washer in use with conventional trackage;
FIGURE 3 is a view taken along line III—III of FIGURE 2;
FIGURE 4 is a partial cross-sectional view of a modified embodiment in accordance with my invention;
FIGURE 5 is a top plan view of FIGURE 4;
FIGURE 6 is a partial cross-sectional view of a further modified embodiment in accordance with my invention; and,
FIGURE 7 is a cross-sectional view of a still further modification in accordance with my invention.

Referring now to the drawings and particularly to FIGURES 1, 2 and 3, I have illustrated an insulating washer block 10 in use with common trackage comprising rail 11, tie 12 and spike 13. As shown in FIGURE 1, the block 10 has a central opening 14 which is formed to snugly receive the shank portion 13a of spike 13. Opening 14 recedes at the back portion 15 to accommodate the sudden broadening of spike 13 along its shank beneath its head to insure that the fit of spike 13 into opening 14 is no more than a snug fit, i.e., if opening 14 is too tight at 15 it would tend to split block 10 along the sides thereof and therefore, I relieve it with recess 15. For the same reason I round off edge 16 of opening 14 so that the pressure of the head 17 of spike 13 bearing thereon does not cause block 10 to split at the corners of edge 16. I further provide an extended portion or lap 18 which fits over base flange 19 of rail 11 and upon which head 17 of spike 13 bears. Further, the height of block 10 to the bottom of lap 18 as indicated by reference number 20 is always less than the height of the edge of base flange 19 from tie 12. This is to insure that spike 13 may be driven sufficiently into tie 12 as to bear properly on lap 18 and flange 19 rather than on block 10 as a whole.

Thus, the amount of gap at 21 depends upon the degree to which spike 13 is brought to bear. If spike 13 is driven hard enough gap 21 may be practically nil but generally it should be a slight amount as shown in FIGURE 2.

Since block 10 is made of tough reinforced material, spike 13 may be brought to bear upon it and in turn flange 19 as strongly as if spike 13 were brought to directly bear upon flange 19. Consequently, rail 11 is completely insulated from spike 13 by the non-conducting block 10 without appreciably sacrificing any of the holding and gripping quality of spike 13 thereby eliminating the major source of electrical leakage, whereby a stronger signal may be carried on rail 11 using less energy.

Referring now to FIGURES 4 and 5, I have illustrated a further embodiment of my invention as used with a conventional rail 11a, tie 12a, rail cushion 22 and screw spike 23. In this embodiment I provide a metal block 24 which has a central opening 25 through which the shank of spike 23 may pass. Opening 25 is chamfered at 26 so that head 27 of spike 23 may be seated therein when drawn up tightly. Block 24 is further provided with a recess 28 into which flange 19a of rail 11a extends. I further provide liner 29 which is made of a tough insulating material such as earlier described and is formed to fit into recess 28 and to snugly fit the outer portion of flange 19a adjacent recess 28. Liner 29 may be fastened into recess 28 in any suitable manner, however, in the present embodiment, I have fastened it therein by means of nipples 30 which are an integral part of liner 29 and which fit into cavities 31 in recess 28 of block 24 and thereby fasten liner 29 therein. It is to be noted that in this embodiment there is a gap 21a which corresponds to gap 21 explained in the first embodiment and which serves the same purpose and results from the same reasons as therein described. In addition, block 24 is recessed along its bottom at 32 for a similar reason, namely, so that block 24 can be tightened down by spike 23 to bear hard on liner 29 and rail flange 19a. Thus, when screw spike 23 is tightened down, block 24 through liner 29 secures rail 11a through cushions 22 to tie 12a. Rail 11a is therefore insulated from block 24 and screw spike 23 and thus suffers no electrical leakage therethrough. Cushion 22 is preferably made of resilient non-conducting material to further insulate the track with respect to the tie; such cushions are well known in the art and applicant does not claim the cushions themselves as being his invention. Nevertheless, it is important to note that said cushions 22 in combination with applicant's insulated washer does completely insulate rail 11a from all possible grounds at the tie.

Referring now to FIGURE 6, I have illustrated a modification of my insulating washer as used with a conventional screw type spike 23b. As shown in FIGURE 6, spike 23b is used to secure rail 11b and cushion 22b to tie 12b. I provide a block 24b which contains an opening 25b therethrough and a recess 28b along its side adjacent flange 19b of rail 11b. Recess 28b is formed to receive the edge portion of flange 19b and bears directly thereon. Opening 25b is chamfered at the upper end thereof as at reference 26b for the proper seating of head 27b of spike 23b. In this embodiment liner 33 is formed to fit snugly into opening 25b including chamfered portion 26b thereof. Liner 33 contains therethrough an opening 34 which is formed to snugly receive spike 23b therein including head portion 27b thereof. Gap 21b is created for the same reasons as earlier explained with regard to gap 21. Recess 32b along the bottom of block 24b is created for the same reason as earlier explained with regard to recess 32. Cushion 22b is preferably made of a non-conducting material. Thus, as is clearly shown in the drawings, block 24b and rail 11b are completely insulated from screw spike 23b and tie 12b whereby applicant prevents electrical leakage at the tie and thereby promotes a stronger signal on less current.

Referring now to FIGURE 7, I show therein a further modification of my invention shown in use with track rail 11c, standard spikes 13c, tie 12c, cushion 22c, tie plate 35 and splice bars 36. In this embodiment rail 11c is abutted to another rail with splice bars 36 by any conventional means (not shown). Tie plate 35 and cushion 22c contain suitable openings 38 and 39 correspondingly for the passage of spike 13c therethrough. Cushion 22c is preferably made of a non-conductive material. Block 10c is composed of the same material as described earlier for block 10 and similar to block 10 has a corresponding opening 14c, recess 15c, rounded edge 16c, and lap 18c all as substantially described earlier with regard to block 10. The variation of block 10c from block 10 resides in the fact that the height 20c is substantially greater to allow lap 18c to fit over flange 37 of splice bar 36 atop flange 19c of rail 11c and further to extend down into opening 38 in tie plate 35. Thus, head 17c of spike 13c bears on lap 18c and in turn on flange 37 of splice bar 36 and flange 19c of rail 11c to secure rail 11c through tie plate 35 and cushion 22c to tie 12c. Block 10c surrounds and thereby insulates spike 13c from bar 36, rail 11c and tie plate 35. Cushion 22c insulates tie plate 35 and thereby rail 11c and splice bar 36 from tie 12c. Thus, electrical leakage from grounding at the tie is eliminated with the resulting benefits of stronger signals on less power. In this last embodiment also, a gap 21c is left for the same aforementioned reasons with regard to gap 21. This last embodiment makes it further apparent that the basic block 10 may be varied at height 20 according to whether tie plates 35 and splice bar 36 occur together or separately.

While I have shown and described certain present preferred embodiments of my invention, it is to be distinctly understood that the invention is not limited thereto but may be otherwise variously embodied within the scope of the following claims.

I claim:

1. In railroad trackage wherein the rail is secured to the tie by a railroad spike having a shank portion pointed at one end with an enlarged head at the other end adapted to overlap the rail flange and thus hold the rail to the tie when the spike is driven into the tie, the combination with said trackage of an insulating washer comprising a block element of substantially non-deformable, non-conductive material having a central opening therethrough snugly receiving and surrounding a portion of said spike shank therein adjacent said spike head, said block element having a flange portion adjacent said spike head extending laterally beyond the portion of said spike head overlapping said rail flange, said block element surrounding said portion of the spike shank extending along said shank from said head to a point along said shank removed from said tie when said spike is driven into said tie whereby a gap occurs between said washer and said tie.

2. In railroad trackage wherein the rail is secured to the tie by a railroad spike having a shank portion pointed at one end with an enlarged head at the other end adapted to overlap the rail flange and thus hold the rail to the tie when the spike is driven into the tie, the combination with said trackage of an insulating washer comprising a block element of glass fiber reinforced nylon material having a central opening therethrough snugly receiving and surrounding a portion of said spike shank therein adjacent said spike head, said block element having a flange portion adjacent said spike head extending laterally beyond the portion of said spike head overlapping said rail flange, said block element surrounding said portion of the spike shank extending along said shank from said head to a point along said shank removed from said tie when said spike is driven into said tie whereby a gap occurs between said washer and said tie.

References Cited in the file of this patent

UNITED STATES PATENTS

| | | |
|---|---|---|
| 998,108 | Metcalf | July 18, 1911 |
| 1,001,879 | Moorhead et al. | Aug. 29, 1911 |
| 1,174,478 | Corey | Mar. 7, 1916 |
| 2,094,279 | Moses | Sept. 28, 1937 |
| 2,169,097 | Hall et al. | Aug. 8, 1939 |
| 2,260,238 | Stedman | Oct. 21, 1941 |
| 2,348,536 | Gordon | May 9, 1944 |
| 2,779,543 | Gronlund | Jan. 29, 1957 |

FOREIGN PATENTS

| | | |
|---|---|---|
| 763,389 | France | Feb. 12, 1934 |
| 1,138,562 | France | Jan. 28, 1957 |
| 825,063 | Great Britain | Dec. 9, 1959 |

OTHER REFERENCES

Product Engineering Bulletin Polychemicals Department, E. I. du Pont de Nemours and Co., Inc., Wilmington, Delaware, 50/1954.